United States Patent
Militello et al.

(10) Patent No.: US 6,707,181 B1
(45) Date of Patent: Mar. 16, 2004

(54) ALTERNATOR FAN

(75) Inventors: Anthony Militello, Ypsilanti, MI (US); Jayeson David Fougner, Ypsilanti, MI (US); Dean Mark Frederick, Clinton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/295,440

(22) Filed: Nov. 15, 2002

(51) Int. Cl.[7] ............................................... H02K 9/06
(52) U.S. Cl. ........................... 310/63; 310/62; 310/263; 416/223 R
(58) Field of Search ............................. 310/58, 62, 63, 310/263, 211, 262; 416/223 R, 226, 228, 231 R, 232, 234, 236 R; 417/423.7; 415/170 A

(56) References Cited

U.S. PATENT DOCUMENTS

| | | |
|---|---|---|
| 1,745,441 A | 2/1930 | Norberg |
| 2,037,880 A | 4/1936 | Charavay |
| 3,037,458 A | 6/1962 | Olmstead et al. |
| 3,075,106 A * | 1/1963 | Chi ........................... 310/60 R |
| 3,285,187 A | 11/1966 | Anderson, Jr. |
| 3,465,523 A | 9/1969 | Clark, Jr. |
| 3,856,434 A * | 12/1974 | Hoffmann .................... 416/184 |
| 4,399,379 A * | 8/1983 | Marks et al. ................... 310/62 |
| 4,488,070 A * | 12/1984 | Iwaki et al. ................... 310/62 |
| 5,144,175 A | 9/1992 | Craggs |
| 5,605,444 A | 2/1997 | Paton et al. |
| 5,693,992 A * | 12/1997 | Kurusu et al. ................. 310/63 |
| 5,925,960 A | 7/1999 | Hayes |
| 6,472,782 B1 * | 10/2002 | Selci ............................ 310/63 |
| 2001/0010434 A1 | 8/2001 | Ishida et al. |

* cited by examiner

*Primary Examiner*—Tran Nguyen
(74) *Attorney, Agent, or Firm*—Brinks Hofer Gilson & Lione

(57) ABSTRACT

An alternator fan having a generally disc-shaped body with opposed first and second faces. The body includes a plurality of ribs that define raised peaks on the first face and recessed valleys on the second face.

22 Claims, 3 Drawing Sheets

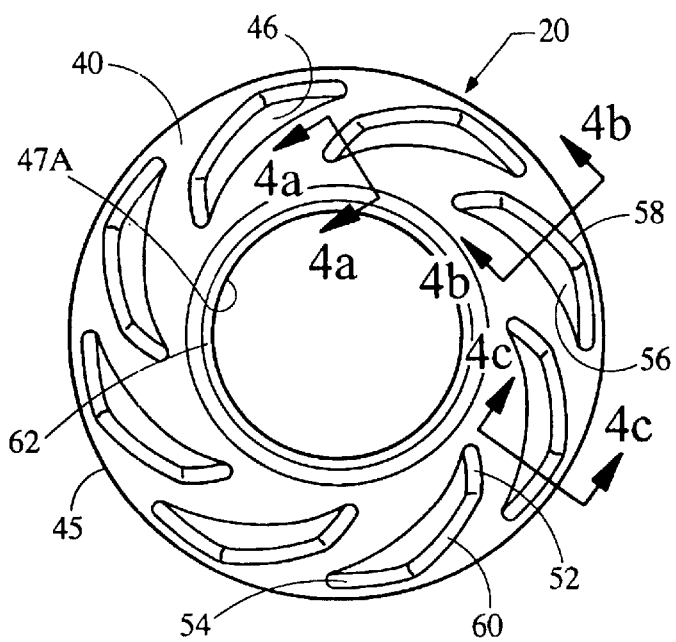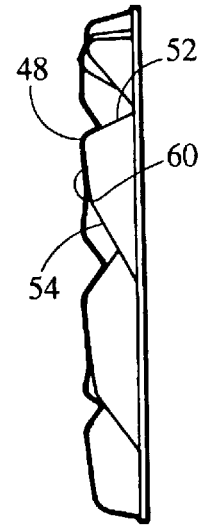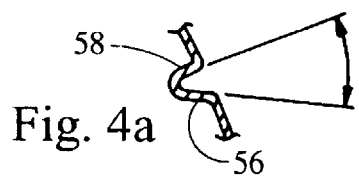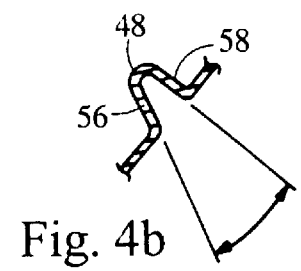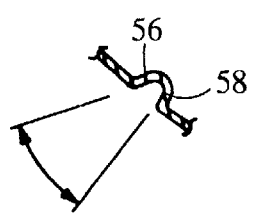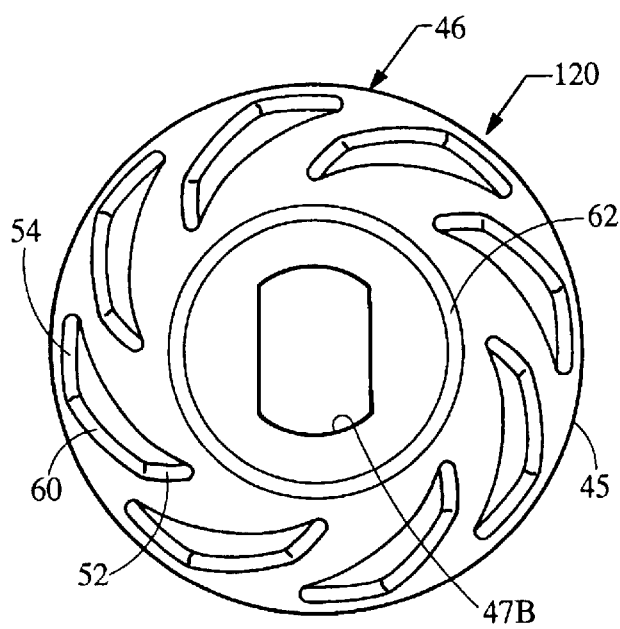

ALTERNATOR FAN

BACKGROUND

1. Technical Field

This invention relates generally to alternators, and more specifically to an improved alternator fan.

2. Description of the Related Art

Automotive alternators commonly use a rotor to provide a changing magnetic field within the machine. This is accomplished by rotating the rotor assembly within the stator core. A standard claw-pole rotor contains a north pole, a south pole, a wound field coil, shaft, slip rings, a front fan and a rear fan. These fans are attached to each end of the rotor assembly and supply the required cooling for the machine by forcing airflow there around.

It is well known that manipulating fan blade geometry, number of blades, and blade spacing can greatly influence airflow rate. One known type of alternator fan is a stamped component with cut-out fan blades. Further, portions of the fan blades are formed essentially by folded up sections of the component. In other words, the fan includes a center portion having blades extending from the center portion. A disadvantage of this type of alternator fan is that the fan blades vibrate and may ultimately break off. Therefore, they may not perform well under the increasingly demanding acceleration conditions of new alternators.

One known design feature used to increase the strength of these types of fan blades involves using gussets and other support structures. However, these design features result in an adverse effect. The disadvantages of manipulating fan blade geometry result in weakening the overall fan structure and increasing turbulence induced broadband noise within the vehicle.

From the above it can be seen that there exists a need for an improved alternator cooling fan. An object of this invention is to provide such an improved alternator fan.

SUMMARY OF INVENTION

The present invention addresses these drawbacks by providing a fan for a motor vehicle alternator, the fan being made from a generally disc-shaped body having opposed first and second faces and defining an axis of rotation centrally therethrough. Further, the body has a plurality of ribs defining raised peaks on the first face and recessed valleys on the second face.

There are numerous advantages of the alternator fan of the present invention. One advantage is an improved capacity to operate at high speeds with greater durability. A second advantage is the potential to increase the number of blades since the present invention does not require cut-outs to form the blades. A third advantage is decreased turbulence due to the ability to integrate a cusp into the body for increased airflow and smoother blade transitions. The decrease in turbulence reduces the induced broadband noise created during operation of the alternator. A fourth advantage is a larger surface area allowing for a continuous mounting surface and improved heat transfer. A fifth advantage is that if the component is stamped from metal, the piece of sheet metal can be thinner than what is required for known alternator fan designs.

These and other aspects and advantages of the present invention will become apparent upon reading the following detailed description of the invention in combination with the accompanying drawings.

BRIEF DESCRIPTION OF THE DRAWINGS

FIG. 2 is a plan view an alternator fan according to the present invention;

FIG. 3 is a side view of the fan seen in FIG. 2;

FIG. 4A is a cross-sectional view generally taken along line A—A in FIG. 2;

FIG. 4B is a cross-sectional view generally taken along line B—B in FIG. 2;

FIG. 4C is a cross-sectional view generally taken along line C—C in FIG. 2;

FIG. 5 is a plan view of a second embodiment of the present invention; and

DETAILED DESCRIPTION OF THE INVENTION

Figure 1:
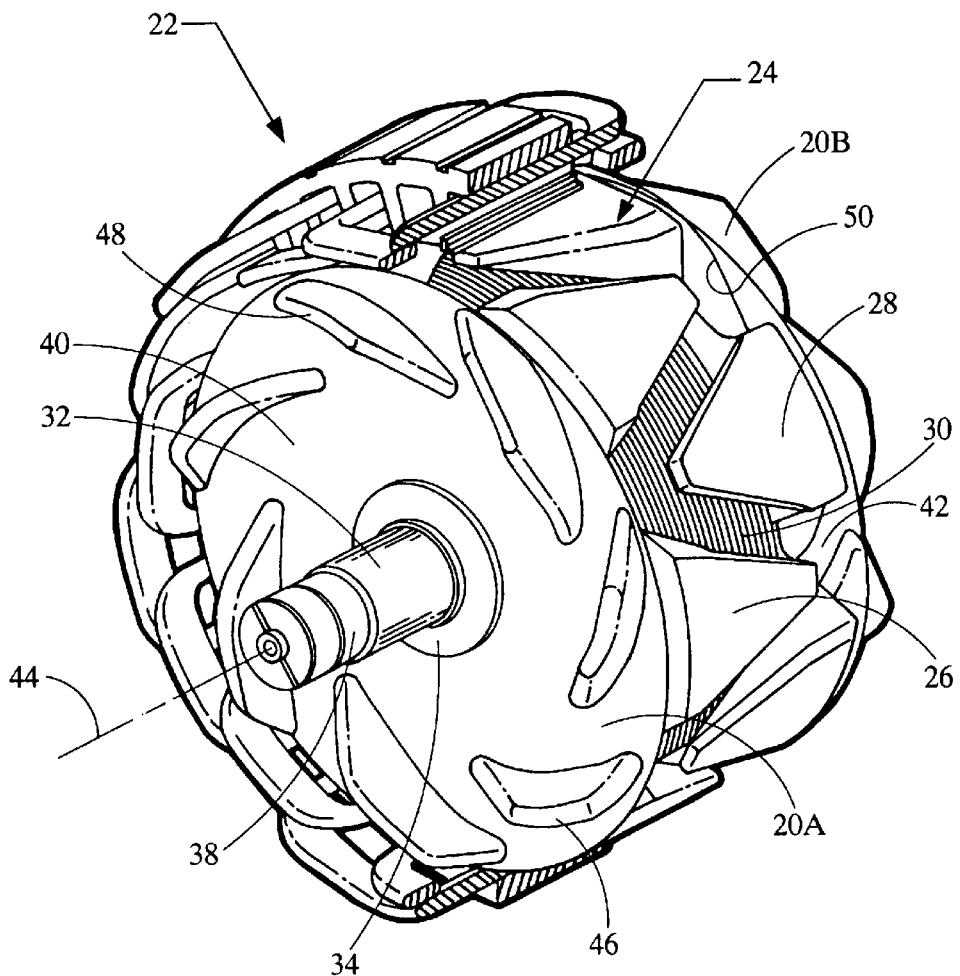
FIG. 1 is a partially cut-away perspective view of an alternator rotor and stator assembly incorporating the principals of the present invention.
Figure 6:
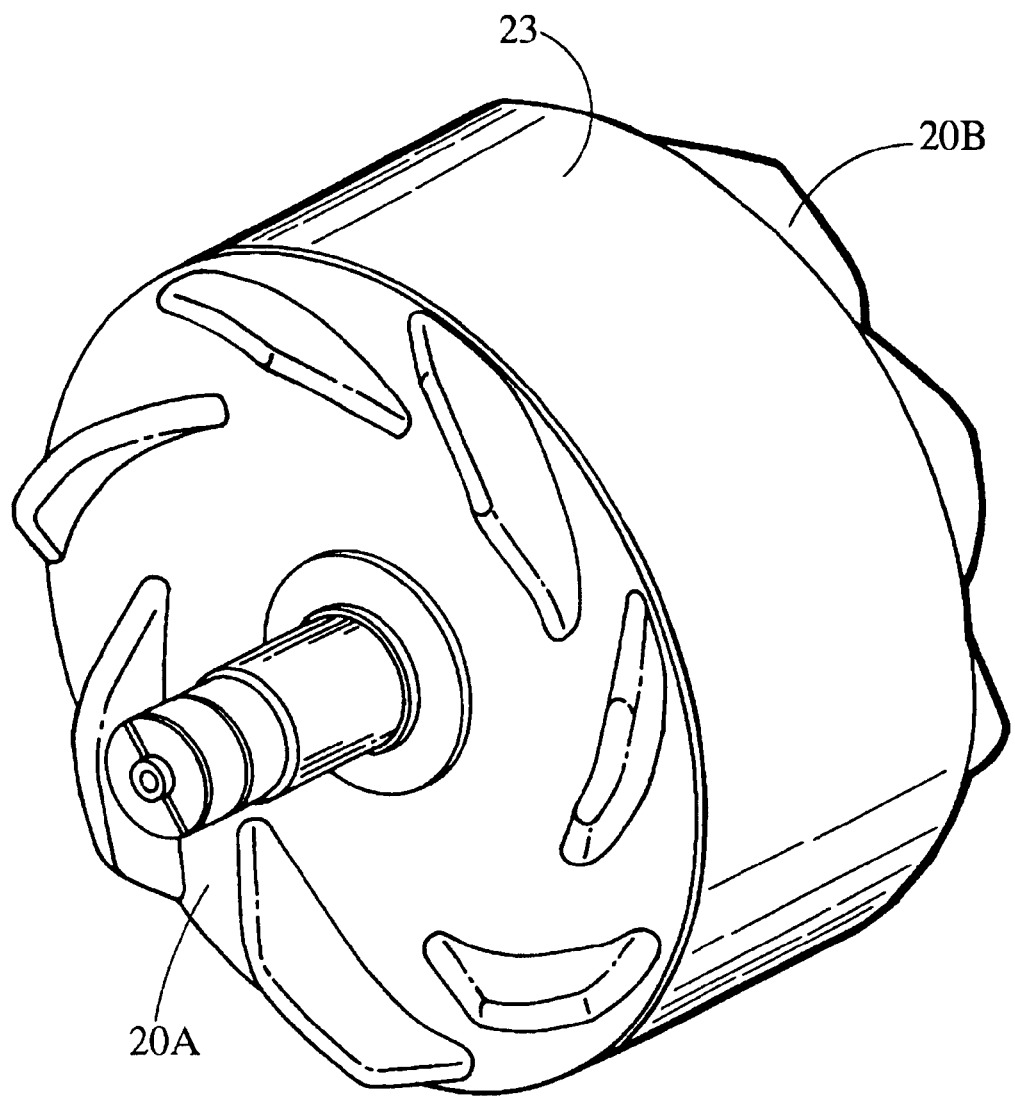
FIG. 6 is a perspective view of an alternator fan according to the present invention installed on a permanent magnet rotor.

FIG. 1 illustrates an automotive alternator rotor and stator assembly, shown generally at 22, embodying the principles of the present invention and including two alternator fans shown generally at 20A and 20B. The illustrated alternator rotor and stator assembly 22 uses a claw-pole style rotor assembly 24 to provide a changing magnetic field with the machine. This is accomplished by rotating the rotor assembly 24 within a stator 25 core. Although a claw-pole style rotor is shown in FIG. 1, it should be noted that the alternator fan of the present invention is not limited to use with this type of rotor. Rather it can be used with any type of rotor assembly, like a permanent magnet rotor 23, shown in FIG. 6.

The claw-pole rotor assembly 24 contains a front pole 26, a rear pole 28, a wound field coil 30, shaft 32, slip rings (not shown), and the two alternator fans 20A, 20B mentioned above. While the rear fan 20B is only partially seen in FIG. 1, it is noted that the two alternator fans 20A, 20B are similarly designed. The first fan 20A is attached to a first exterior surface of the rotor assembly and the second fan 20B is attached to a second exterior surface of the rotor assembly. More specifically, the first fan 20A is attached to the front pole 26 and the second fan 20B is attached to the rear pole 28.

Typically, the rotor assembly 24 is assembled by placing the wound field coil 30 onto a hub of one of the poles 26 or 28. The opposite pole is assembled onto the assembly of the first pole with the wound field coil 30. The shaft 32 is inserted through bores that are in the center of each of the two poles 26, 28, engaging the poles 26, 28 and locking the assembly 24 together. The slip rings (not shown) are pressed onto the rear end of the shaft 32 adjacent to the second fan 20B. A rotor stop 34 is assembled onto the front of the shaft 32 adjacent to the first fan 20A. The wound field coil 30 wire leads are routed across the back face of the poles and in grooves 38 in the shaft 32. The wire leads, not shown, are electrically connected to the slip ring copper shells. The fans 20A, 20B are placed in position and permanently attached to the poles 26, 28.

As shown in FIGS. 1 and 2, the fans 20A and 20B, hereinafter just fan 20, is a generally disc-shaped body 21 having opposed first and second faces 40, 42. The body 21 has an outer circumference 45 and a central aperture 47 that defines an axis of rotation 44 through its center. In one embodiment, shown in FIG. 2, the aperture 47A is generally circular-shaped. In another embodiment, shown in FIG. 5, the aperture 47B is generally oval-shaped. The particular shape of the aperture will depend upon the manner used to lock the assembly 24 together.

Provided on the body 21 of the fan 20 are a plurality of ribs 46. The ribs 46 are formed such that they define raised peaks 48 on the first face 40, which is an outboard face, and recessed valleys 50 on the second face 42, which is an in-board face. In other words, the cross-section of each rib 46 is generally U-shaped, as shown in FIGS. 4A, 4B, and 4C. While illustrated with seven ribs in FIG. 1 and eight ribs in FIG. 2, the number of ribs 46 per disc-shaped body is determined based on the inherent frequencies resulting from the particular design of a rotating rotor assembly.

Each rib 46 in the plurality of ribs is generally radially oriented. More specifically, each rib 46 is radially curved. It should be noted, however, that the ribs may not be radially curved. Further, each rib 46 includes an inner end 52, the portion of the rib 46 closest to the center 47 of the disc-shaped body 21, and an outer end 54, the portion of the rib 46 closest to the outer circumference 45 of the disc-shaped body 21.

Each rib 46 in the plurality of ribs also includes an inboard wall 56 and an outboard wall 58. The inboard wall 56 is defined as the wall that runs between the inner end 52 and the outer end 54 and generally faces the center 47 of the disc-shaped body 21. Conversely, the outboard wall 58 is defined as the wall that runs between the inner end 52 and the outer end 54 and generally faces the outer circumference 45 of the disc-shaped body 21.

Positioned between the inner end 52 and the outer end 54, each rib 46 in the plurality of ribs may also include a middle section 60. The inner end 52 has a first slope calculated relative to the first face 40. The outer end has a second slope calculated relative to the first face 40. The middle section 60 has a third slope calculated relative to the first face 40. Preferably, the inner end 52 has the steepest slope of the three. The middle section 60 will be the least steep of the three. In fact, the middle section 60 may be parallel to the first face 40 of the fan body 21. Having a slope that is steeper than the middle section 60, the outer end's slope is not as steep as the inner end 52.

The fan of the present invention may also include an integrated inlet cusp 62. Viewed on the first face 40 side of the fan 20, the inlet cusp 62 is a raised, generally circular section of the body 21. The cusp is concentric with the disc-shaped body 21 and the axis 44. In one embodiment, the cusp 62 may be immediately adjacent a center aperture 47. In another embodiment, shown in FIG. 5, the cusp 62 may be radially spaced apart from the center aperture 47, but positioned radially between the center aperture 47 and the inner ends 52 of the ribs 46. The inlet cusp 62 aides in directing the airflow coming in axially in the center of the fan and exiting radially.

A central portion of the second face 42 of the disc-shaped body 21 functions as a continuous mounting surface for the fan 20. Accordingly, the second face 42 is used to attach the fan 20 to the rotor assembly 24.

During operation of the alternator rotor and stator assembly 22, referring to FIG. 1, air is drawn through the alternator housing, not shown, toward each fan 20A, 20B parallel to the axis of rotation 44. The air first encounters the inlet cusp 62 and is directed radially over the first face 40 of the, disc-shaped body 21 and toward the plurality of ribs 46. At the ribs 46, the air first contacts the inner end 52 of each rib 46 where some of the air is diverted along the outboard wall 58 and some of the air is diverted along the inboard wall 56. An important feature of the present invention that contributes to efficient airflow is the smoothness of each rib 46. Efficiency of the airflow is further enhanced due to the contiguous nature of the inner end 52, the middle section 60, and the outer end 54.

The disc-shaped body 20 of the present invention could be made using several different methods and materials. In one embodiment, the fan may be stamped from sheet metal, including but not limited to, steel. In another embodiment, the fan may be molded from a formable material, including but not limited to, plastic.

Another feature of the present invention is the ability to space the ribs in an atypical manner. The ribs may be spaced atypically in an effort to reduce the timing of the interactions between rotating and stationary parts. In other words, the fewer the number of interactions between rotating and stationary components at any given time, the lower the overall noise caused by vibrations.

As any person skilled in the art of alternators will recognize from the previous detailed description and from the figures and claims, modifications and changes can be made to the preferred embodiments of the invention without departing from the scope of this invention defined in the following claims.

We claim:

1. A fan for an electrical machine, said fan comprising:
a generally disc-shaped body defining an axis of rotation centrally therethrough, said body having opposed first and second faces, said body further including a plurality of ribs defining raised peaks on said first face, said plurality of ribs respectively defining corresponding recessed valleys on said second face.

2. The fan of claim 1 wherein each rib in said plurality of ribs is generally radially oriented.

3. The fan of claim 2 wherein each rib in said plurality of ribs is radially curved.

4. The fan of claim 1 wherein each rib in said plurality of ribs includes an inner end and an outer end.

5. The fan of claim 4 wherein each rib includes an inboard wall and an outboard wall.

6. The fan of claim 5 wherein said inner end has a first slope relative to said first face and said outer end has a second slope relative to said first face.

7. The fan of claim 6 wherein each rib includes a middle section positioned between said inner end and said outer end.

8. The fan of claim 7 wherein said middle section has a third slope relative to said first face.

9. The fan of claim 8 wherein said inner end, said middle section, and said outer end are contiguous.

10. The fan of claim 1 wherein each rib in said plurality of ribs has a generally U-shaped cross section.

11. The fan of claim 1 further comprising an integrated inlet cusp.

12. The fan of claim 11 wherein said integrated inlet cusp is a raised generally circular section on said first face of said generally disc-shaped body.

13. The fan of claim 12 wherein the cusp is adjacent a center aperture formed in said fan.

14. The fan of claim 12 wherein the cusp is radially spaced apart from a center aperture formed in said fan.

15. The fan of claim 1 wherein said second face of said disc-shaped body is a mounting surface.

16. The fan of claim 1 further including a central aperture.

17. The fan of claim 16 wherein said central aperture is generally oval shaped.

18. The fan of claim 1 wherein said generally disc-shaped body is stamped from sheet metal.

19. The fan of claim 1 wherein said generally disc-shaped body is molded from a formable material.

20. The fan of claim 19 wherein said formable material is plastic.

21. An automobile alternator assembly comprising:
- a rotor assembly having a first pole, a second pole, a field coil disposed between said first pole and said second pole, and a shaft to align said first pole, said field coil and said second pole;
- at least one fan having a generally disc-shaped body with opposed first and second faces, a plurality of ribs formed in said body and defining peaks on said first face and respectively corresponding recessed valleys on said second face, said at least one fan being mounted to said rotor assembly generally adjacent to said first pole; and
- a stator at least partially encircling said rotor assembly.

22. An machine comprising:
- a rotor assembly having a first end and a second end;
- a fan having a generally disc-shaped body with opposed first and second faces, a plurality of ribs formed in said body and defining peaks on said first face and respectively corresponding recessed valleys on said second face, said fan being mounted to said first end of said rotor assembly; and
- a stator at least partially encircling said rotor assembly.

* * * * *

UNITED STATES PATENT AND TRADEMARK OFFICE
CERTIFICATE OF CORRECTION

PATENT NO. : 6,707,181 B1
DATED : March 16, 2004
INVENTOR(S) : Anthony Militello et al.

It is certified that error appears in the above-identified patent and that said Letters Patent is hereby corrected as shown below:

Column 6,
Line 1, after "respectively" insert -- defining --.
Line 6, before "machine" insert -- electric --.
Line 11, before "corresponding" insert -- defining --.

Signed and Sealed this

Twenty-third Day of November, 2004

JON W. DUDAS
*Director of the United States Patent and Trademark Office*